United States Patent
Guilley et al.

(10) Patent No.: US 8,527,133 B2
(45) Date of Patent: Sep. 3, 2013

(54) DEVICE FOR MANAGING PILOTING TASKS CARRIED OUT BY A CREW OF AN AIRCRAFT

(75) Inventors: Fabien Guilley, Merenvielle (FR); Gabrielle De Brito, Lapeyrouse-Fossat (FR); Gilles Francois, Toulouse (FR)

(73) Assignee: Thales, Neuilly sur Siene (FR)

( * ) Notice: Subject to any disclaimer, the term of this patent is extended or adjusted under 35 U.S.C. 154(b) by 913 days.

(21) Appl. No.: 12/636,873

(22) Filed: Dec. 14, 2009

(65) Prior Publication Data

US 2010/0161157 A1 Jun. 24, 2010

(30) Foreign Application Priority Data

Dec. 19, 2008 (FR) ...................................... 08 07227

(51) Int. Cl.
*G01M 17/00* (2006.01)
*G06F 7/00* (2006.01)

(52) U.S. Cl.
USPC .............. 701/29.1; 701/14; 701/1; 701/31.6; 701/32.7; 701/3; 340/945; 345/173

(58) Field of Classification Search
USPC ............................... 715/243; 701/3; 340/483
See application file for complete search history.

(56) References Cited

U.S. PATENT DOCUMENTS

| | | | | |
|---|---|---|---|---|
| 4,970,683 A * | 11/1990 | Harshaw et al. | ............... | 715/841 |
| 5,454,074 A * | 9/1995 | Hartel et al. | ................... | 715/710 |
| 6,127,944 A * | 10/2000 | Daly et al. | ..................... | 340/963 |
| 6,633,801 B1 * | 10/2003 | Durlacher et al. | ................ | 701/9 |
| 6,714,846 B2 * | 3/2004 | Trsar et al. | .................... | 701/34.3 |
| 7,289,890 B2 * | 10/2007 | Mitchell et al. | .................... | 701/1 |
| 7,333,881 B2 * | 2/2008 | Binderberger | ............... | 701/29.4 |
| 7,392,486 B1 * | 6/2008 | Gyde et al. | ..................... | 715/780 |
| 7,765,005 B2 * | 7/2010 | Stevenson | ........................ | 607/37 |
| 7,877,686 B2 * | 1/2011 | Abbott et al. | ................. | 715/712 |
| 2006/0028012 A1 * | 2/2006 | Holder et al. | ................ | 283/66.1 |

(Continued)

FOREIGN PATENT DOCUMENTS

| | | |
|---|---|---|
| FR | 2913800 A1 | 9/2008 |
| GB | 2050979 A * | 1/1981 |

OTHER PUBLICATIONS

Strunk Jr. and E.B. White, The Elements of Style 3rd Ed., p. 40.*

*Primary Examiner* — Thomas Black
*Assistant Examiner* — Paul Castro
(74) *Attorney, Agent, or Firm* — Stroock & Stroock & Lavan LLP (57) ABSTRACT

The present invention lies in the field of embedded flight management systems on board aircraft. The invention relates notably to a system for managing alerts and procedures, and more precisely to a device for managing piloting tasks carried out by a crew of an aircraft. The device for managing tasks (1) according to the invention comprises:

a module for managing alerts (4) generating alerts as a function of information originating from systems (2) of the aircraft, said module for managing alerts (4) being associated with a first display system (5) and with a first monitoring panel (7);

a module for managing tasks (8) creating a task on receipt of an alert requiring at least one action on the part of the crew, creating a task associated with a procedure, said module for managing tasks (8) being associated with a second display system (11) and with a second monitoring panel (14);

a module for managing a procedure (16) corresponding to a task selected by the crew, said module for managing a procedure (16) being associated with a third display system (17) and with a third monitoring panel (18).

9 Claims, 3 Drawing Sheets

(56) References Cited

U.S. PATENT DOCUMENTS

2008/0088433 A1* 4/2008 Baker et al. .................. 340/531
2008/0184166 A1* 7/2008 Getson et al. ................. 715/810
2008/0306639 A1 12/2008 Fleury et al.
2009/0108140 A1* 4/2009 Adams et al. ................. 244/190

* cited by examiner

FIG.2d

DEVICE FOR MANAGING PILOTING TASKS CARRIED OUT BY A CREW OF AN AIRCRAFT

CROSS REFERENCE TO RELATED APPLICATIONS

The present application claims priority to French Patent Application Serial No. 0807227, filed Jan. 19, 2008, which is hereby incorporated by reference in its entirety.

BACKGROUND OF THE INVENTION

The present invention lies in the field of embedded flight management systems on board aircraft. The invention relates notably to a system for managing alerts and procedures, and more precisely to a device for managing piloting tasks carried out by a crew of an aircraft.

BRIEF DESCRIPTION OF THE PRIOR ART

An aircraft crew, including a flight captain and a copilot, work in an environment full of information. The crew are notably subjected to a lot of stimuli affecting the various senses:
  visual stimuli originating:
    from screens of the cockpit displaying various pages of information;
    from monitoring panels;
    from indication lights on a ceiling panel;
    from various positions of buttons such as coil turret, circuit breaker;
    from buttons named "Master Warning" and "Master Caution";
  auditory stimuli originating:
    from operational alerts such as an announcement of a landing altitude, "PULL UP" and "TERRAIN" alerts from the TAWS; the TAWS being an item of equipment making it possible notably to avoid collisions with the terrain, TAWS being an acronym standing for Terrain Avoidance Warning System; a "PULL UP" alert being an alert requiring restoral of the aircraft, a "TERRAIN" alert being an alert announcing the imminence of a collision with the terrain;
    from alerts in the case of failures, these alerts possibly being single rings, or rings repeated continuously;
    from ATC communications with ground controllers, the acronym standing for the expression Air Traffic Control;
    from internal communications with CFPs, the acronym standing for Commercial Flight Personnel, and with the aircraft cabin personnel;
  tactile stimuli originating:
    from an oscillator of the aircraft control column in the case of aircraft stall;
  olfactory stimuli originating from smoke, for example in the case of severe damage;
All these stimuli must be taken into account by the crew and generates permanent stress which becomes very significant should there be a problem.
  Moreover, to manage various systems of the aircraft and ensure basic piloting of the aircraft, the crew must perform various actions concurrently from among:
    actions on primary controls of the aircraft: control column, rudder bar, engine power control, propeller pitch control, compensator control;
    regular flight safety checks, by checking notably: primary flight parameters such as the engine operating parameters, the speed, the altitude; by checking the surroundings of an environment of the aircraft such as proximity to other aircraft, the terrain; failures and notably procedures to be carried out in case of failure;
    navigation tasks relating notably to accurate and complex information to be entered by the crew such as a flight plan for the aircraft;
    monitoring of the ATC comprising passive listening for orders from an air traffic controller, active dialogues with a controller;
    communications with an airline by way of ACARS messages, the acronym standing for the expression Aircraft Communications Addressing and Reporting System;
    information regarding the passengers and the CFP.
  The concomitance of the various stimuli with the actions to be carried out by the crew gives rise to frequent interruptions of tasks which are then unaccomplished or imperfectly accomplished when one of the stimuli requires full attention on the part of the crew, see an action to be carried out urgently.
  A centralized alerts management system, named FWS for Flight Warning System, can allow the crew to be aware of a set of alerts originating from various flight management and monitoring systems, linked to the FWS.
  The alerts presented to the crew may relate to aircraft system's failures. Aircraft system's failures of the aircraft may be mechanical breakdown. The flight control system is an example of a system to which mechanical breakdown relate. Other failures may have an impact on the proper operation of the aircraft's systems such as failures affecting a hydraulic system, an electrical network, an electronic system, a computer. The various alerts may:
    require a restoral action;
    relate to a warning pertaining to a performance problem with a function of the aircraft;
    relate to a warning indicating that the aircraft is not in a state to take off again.
  The FWS furthermore makes it possible to advise the crew of a resolution procedure to be applied in case an alert should arise, if one exists. A resolution procedure can comprise several elementary steps or actions to be accomplished so as to solve the problem that generated the alert. The various associated alerts and procedures are presented to the crew by a system named ECAM, the acronym standing for the expression Electronic Centralized Aircraft Monitor. The ECAM allows centralized display of information originating furthermore from various electronic systems for managing and monitoring the aircraft.
  However the ECAM does not allow display of the complete list of alerts at the same time as a procedure to be carried out. An important alert popping up occults the other alerts and/or the resolution procedures which are currently being carried out or which are to be carried out. This mode of operation does not allow the crew to manage the various procedures that they have to carry out. Certain procedures may therefore be carried out imperfectly, or else not be performed in due time, and this may endanger the aircraft.

SUMMARY OF THE INVENTION

An aim of the invention is notably to alleviate the aforesaid drawbacks. For this purpose, the subject of the invention is a device for managing piloting tasks carried out by a crew of an aircraft. The device according to the invention can notably comprise:
  a function for managing alerts;
  a function for managing piloting tasks;

a function for managing a procedure corresponding notably to a task selected by the crew with a means for monitoring tasks, from among tasks displayed by a means for displaying tasks;

at least one means for displaying: alerts and/or tasks and/or procedures;

at least one means for monitoring: alerts and/or tasks and/or procedures.

The function for managing alerts can notably:

generate alerts on receipt of information originating for example from first systems of the aircraft;

transmit the alerts generated to the means for displaying alerts.

The function for managing piloting tasks is notably able to:

create a task on receipt of an alert, for example generated by the function for managing the alerts, requiring notably a processing procedure carried out by the crew;

create a task associated with an operational procedure;

create a task associated with a procedure for example chosen by the crew, with a means for monitoring the tasks, from among a set of operational procedures that is presented by the means for displaying the procedures, said set of operational procedures being able to be stored in a first database;

create a task on receipt of actions to be carried out originating from avionics systems.

The function for managing piloting tasks can notably transmit the tasks created to the means for displaying tasks.

The function for managing a procedure can notably transmit the procedure to the means for displaying procedures.

The function for managing the alerts can ensure management of a list of alerts presented, for example, by the means for displaying alerts. The management of the list of alerts can notably comprise:

a function for sorting the alerts of the list, for example according to a level of seriousness of each alert;

a function for deleting an alert from the list of alerts notably on receipt of a delete alert order originating from the means for monitoring alerts actuated by the crew;

a function for deleting an alert when a task corresponding to the alert is deleted.

The function for managing tasks can delete tasks on:

receipt of an order to delete a task originating from the means for monitoring tasks actuated by the crew;

deletion of an alert.

The operational procedures can be transmitted to the function for managing the tasks by a procedure detection function.

The function for managing a procedure can notably:

calculate a state of progress of the procedure notably as a function of acknowledgements of actions making up the procedure, said procedure comprising at least one action to be carried out;

transmit the calculated state of progress notably: to the function for managing the tasks, to the means for displaying procedures;

store the state of progress for example in a second database.

The state of progress of a procedure can be initialized by the function for managing a procedure on receipt of an initialization order originating from the function for managing tasks. On receipt of a state of progress indicating that all the actions of a procedure have been carried out, the function for managing the tasks deletes the task corresponding to the procedure.

An acknowledgement of an action can be transmitted to the function for managing a procedure by:

a second system of the aircraft carrying out the action;

the means for monitoring procedures actuated by the crew.

Information relating to an action of a procedure can be displayed by a means for displaying information relating to an action, notably by the function for managing a procedure, of an order to display information relating to an action selected for example from among the actions displayed by the means for displaying procedures. The action can be selected with a means for monitoring procedures actuated by the crew.

The means for displaying alerts, the means for displaying tasks, the means for displaying procedures can be implemented by one and the same display device.

The means for monitoring alerts, the means for monitoring tasks, the means for monitoring procedures, can be embodied by one and the same monitoring device.

The invention has notably the principal advantages of having an overview of the tasks to be carried out by a crew in the course of a flight and allowing a smoothing of the crew's workload.

BRIEF DESCRIPTION OF THE DRAWINGS

Other characteristics and advantages of the invention will become apparent with the aid of the description which follows, given by way of nonlimiting illustration and in conjunction with the appended drawings which represent.

DETAILED DESCRIPTION

Figure 1:
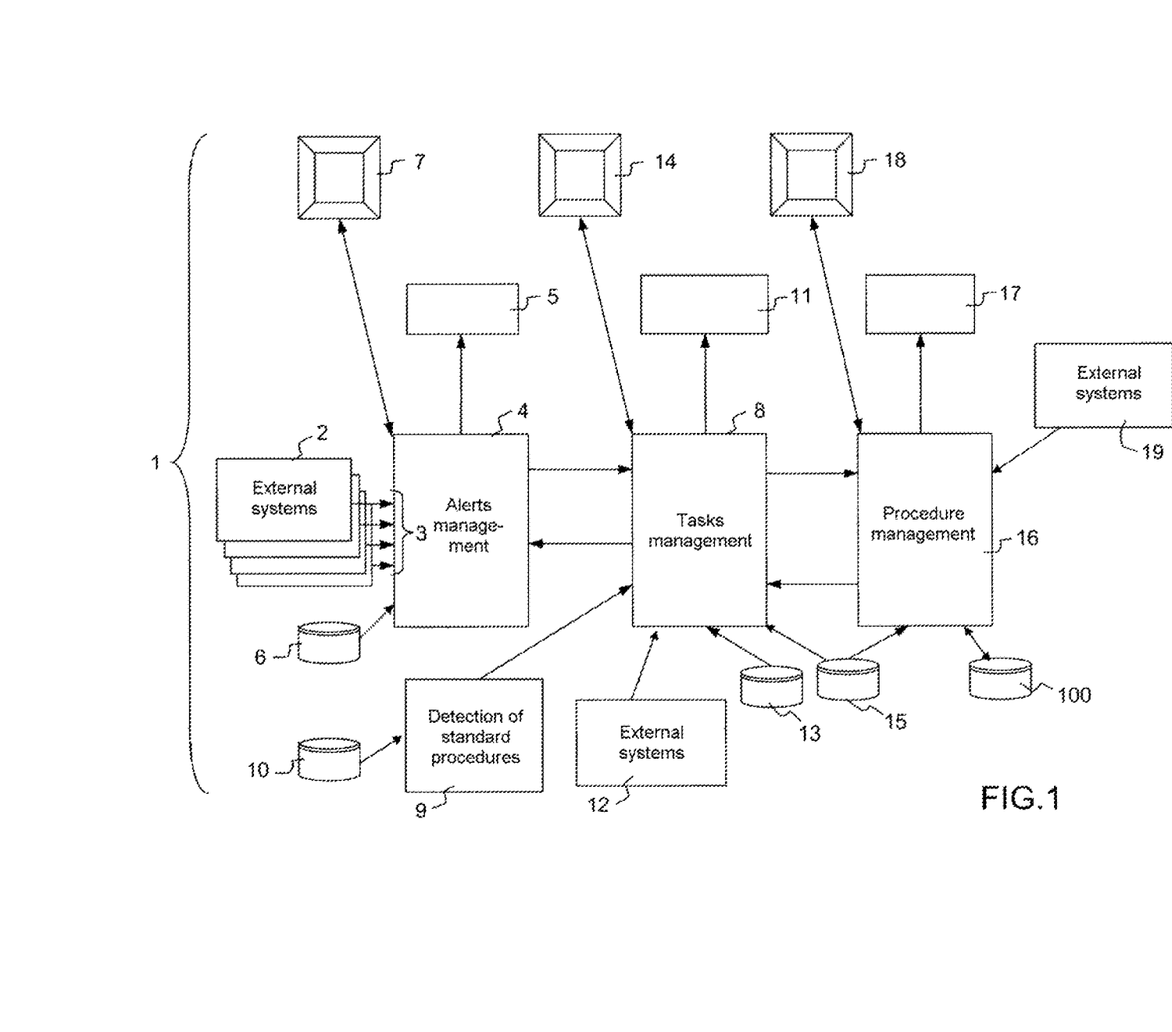
FIG. 1: a device for managing tasks to be carried out by a crew according to the invention.

FIG. 1 represents a device 1 for managing piloting tasks carried out by a crew of an aircraft. The various tasks to be accomplished by a crew can notably be related to an alert, to a standard operational procedure. An alert may arise following detection of a problem or failure by one or more of the aircraft's systems. An alert may require a resolution measure to be implemented by the crew. A resolution measure may notably be described by a procedure. A procedure comprises one or more actions preferably carried out in a defined order.

The device for managing tasks 1 according to the invention can form part of a centralized system for managing alerts, named FWS for Flight Warning System.

Information 3 giving rise to the generation of one or more alerts may be transmitted by various first systems 2 of the aircraft to the device for managing tasks 1. The various first systems 2 are systems external to the device 1 according to the invention. The first external systems 2 can be for example systems:

for detecting fire;
for managing an electrical network of the aircraft;
for managing a hydraulic network of the aircraft;
for managing flight controls;
for managing the deicing of the aircraft;
for conditioning the air of the cabin;
for managing the fuel on board the aircraft.

The first external systems 2 can transmit information related to their state of operation or of malfunction. The first external systems 2 can also transmit measurement information such as a measurement of pressure inside the cabin to detect a depressurization therein. The first external systems can also transmit alerts directly.

The various items of information 3 provided to the device 1 according to the invention may therefore be:
   simple data;
   alerts generated directly by the first external systems 2.

The information 3 provided to the device for managing the alerts 1 is taken into account by a module for managing the alerts 4 forming part of the device for managing the alerts 1 according to the invention. On receipt of alerts transmitted by a first external system 2, the module for managing the alerts 4 can transmit the alerts received to a first display system 5. When the information 3 received is simple data, the module for managing the alerts 4 performs an interpretation of the data received 3 so as to determine whether it is necessary to generate an alert. To this end, the module for managing alerts 4 implements an alerts detection function. When the information 3 received already correspond to alerts, the module for managing the alerts 4 transmits it to a first display device 5. The first display device 5 makes it possible notably to present the various alerts to the crew.

Whether an alert is generated directly by a first external system 2 or whether it is generated by the alerts detection function, the alert passes through a filtering function. The filtering function makes it possible notably to determine a level of seriousness of the alert. The level of seriousness determined makes it possible to allocate an order number to the alert. The alert is thereafter inserted according to its order number into a list of alerts. The filtering function also makes it possible to defer display of the alerts during periods when the crew has a heavy workload, such as during takeoff for example. The list of alerts is managed by the module for managing the alerts 4. Thus the module for managing the alerts 4 makes it possible notably to sort and to update the list of alerts. The list of ongoing alerts can be displayed by the first display means 5.

The module for managing the alerts 4 can also comprise a function for interpreting alerts making it possible to establish a tie between the alert generated and a defined type of alert. A first database 6 can comprise for each defined type of alert, an alert name to be displayed as well as a priority level corresponding to the type of alert. A priority level can be associated with a display colour making it possible for example to render important alerts, having a high priority level, more visible to the crew.

The module for managing the alerts 4 can also receive orders from a first monitoring panel 7. The first monitoring panel 7 allows notably the crew to delete alerts that they do not wish to see appear on the first display means 5. The first monitoring panel 7 therefore allows interactive management of the displaying of the alerts.

The module for managing the alerts 4 thereafter transmits the list of current alerts to a module for managing tasks 8. The module for managing the tasks 8 can create a task for the alerts which may require a resolution measure to be performed in the form of a procedure for processing an alert. Certain alerts have no associated procedure, so no task is associated with them. The module for managing tasks 8 updates the list of tasks on receipt of a new list of current alerts.

The module for managing tasks 8 manages a list of tasks comprising notably tasks related to the alerts. The list of tasks is updated by the module for managing the tasks 8 as a function of the evolution of the list of alerts. For example when an alert disappears, the corresponding task is deleted from the list of tasks.

The module for managing the tasks 8 can also create tasks related to standard operational procedures. The standard operational procedures can be transmitted to the module for managing the tasks 8 by a standard procedure detection module 9. A standard procedure can be an applicable procedure according to an aircraft flight phase or a ground phase. For example after takeoff, the crew must perform a check-list. The takeoff check-list is a standard operational procedure. For each operational procedure, a task corresponding to the procedure can be generated. Other phases can form the subject of standard operational procedures, such as: an airport approach, a descent, a climb, a landing, engine start-up, hookup of the aircraft to the ground power unit, a positioning of the brakes on the wheels.

The standard procedure detection module 9 makes it possible to detect according to the current flight phase or the current ground phase, the standard procedure or procedures to be performed. A set of standard procedures can be made available to the standard procedure detection module 9 by a second database of standard procedures 10. The second database of standard procedures 10 comprises notably each standard procedure to be performed for each flight phase or each ground phase. The standard procedure detection module 9 can notably take account of current state parameters of the aircraft so as to determine the flight phase or the current ground phase. The aircraft state parameters can be for example its speed, its altitude, its acceleration, various flight parameters. The aircraft state parameters can be provided to the standard procedure detection module 9 by the aircraft's measurement devices.

Thus for each flight phase, the various tasks relating to the standard procedures can be generated so as to be displayed on a second display means 11.

Other second systems 12 external to the device 1 for managing tasks can transmit actions to be carried out by the crew to the module for managing the tasks 8. The module for managing the tasks 8 can thus generate tasks related to actions originating from second external systems 12 such as:
   an FMS system, the acronym standing for the expression Flight Management System;
   a TAWS, system, the acronym standing for the expression Terrain Avoidance Warning System;
   an ATC system.

Generally the external systems 12 can be avionics systems. For example an ATC system can transmit the following action to the module for managing the tasks 8: contact a control centre when the aircraft enters this centre's zone of responsibility.

The various tasks generated by the module for managing tasks 8 can be ordered according to a priority level for example. A priority level can be associated with each type of task that may possibly be generated. The information such as a priority level, a name to be displayed for each type of task generated, can be stored in a third database 13. The third database 13 can therefore notably transmit to the module for managing the tasks 8, on request for example, a priority level corresponding to a given task. Once the various tasks have been ordered, the module for managing the tasks 8 transmits the set of tasks for display, to the second display means 11. The second display means 11 presents the set of tasks in the form of a list of ordered tasks.

The module for managing the tasks 8 can perform static management of tasks, as in the example described, or dynamic management of tasks. In the case of dynamic task management, the list of tasks can evolve over time.

A second monitoring panel 14 allows a user to delete tasks from the list, for example already accomplished tasks. The tasks that may possibly be deleted from the list of tasks can form part of a subset of deletable tasks excluding for example tasks related to alerts.

The second monitoring panel 14 allows notably a crew member to consult procedures stored in a fourth database of procedures 15. For example, the second display means 11 can present a set of consultable procedures to the crew, contained in a fourth database of procedures 15. The fourth database of procedures 15 comprises the set of existing procedures, which may or may not be associated with an alert. The set of consultable procedures is displayed in the form of a list of tasks, a task caption possibly being assigned to each procedure. Thus, a procedure can be selected by way of the second monitoring panel 14 for presentation to the crew.

The second monitoring panel 14 can allow a user to insert a task into the list of tasks. The inserted task can for example correspond to a procedure stored in the fourth database 15. The second monitoring panel 14, on a user action, transmits an order to insert the task selected into the list of current tasks to the module for managing the tasks 8. Thus the crew can anticipate the carrying out of a complex procedure by inserting it into the list of tasks to be accomplished. The creation of a task related to a procedure chosen by the crew allows the crew to plan the tasks to be accomplished in the course of the flight. Such planning of the tasks allows the crew to smooth their workload. The smoothing of the crew's workload makes it possible to work in a normal stress situation and thus makes it possible to avoid errors in the execution of the procedures.

The second monitoring panel 14 makes it possible to select a task, so as to display the corresponding procedure. To this end, once a task has been selected, the selection is transmitted to the module for managing the tasks 8 by the second monitoring panel 14. The module for managing the tasks 8 thereafter transmits the selected task to a procedure management module 16. The procedure management module 16 will thereafter search through the fourth database of procedures 15 for the procedure to be displayed by a third display means 17. The procedure corresponding to the selected task can be displayed in the form of a list of actions to be accomplished. The list of actions is for example presented chronologically.

A third monitoring panel 18 makes it possible to select an action displayed by the third display means 17. The selection of an action can allow display of information relating to the action selected on a screen other than the third display means 17. For example, on selection of an action, a system page can be displayed. A system page comprises a set of information relating to a system of the aircraft. The system in question can be an electrical, mechanical system.

A selected action can, by way of the third monitoring panel 18, be acknowledged by a user, the acknowledgement of an action being able to signify that it has been fully accomplished by the crew. An acknowledged action can be presented on the third display means 17 so as to indicate that it has been performed. For example, an acknowledged action can appear in another colour relative to the display colour for the other actions of the procedure displayed for example.

The third monitoring panel 18 can also make it possible to acknowledge the procedure displayed.

Third external systems 19 can also dispatch acknowledgements of actions to the procedure management module 16 when actions are accomplished. The third external systems 19 are for example systems implementing one or more actions of the procedure. The procedure management module 16 takes into account the various acknowledgements of actions, originating from third external systems 19 and from the crew by way of the third monitoring panel 17. The third external systems 19 can for example carry out the action or comprise means for checking that the action is carried out.

With the various acknowledgements, the procedure management module 16 calculates a state of progress of the processing of the displayed procedure. The state of progress of the processing of the procedure is thereafter placed in memory in a fifth database 100. With each modification of the state of progress of the processing of the procedure, this state is updated in the fifth database 100 by the procedure management module 16. The state of progress of the processing of the procedure is also transmitted to the module for managing the tasks 8. The module for managing the tasks 8 uses the state of progress of the procedure so as to be able to represent a task according to the state of progress of the processing of the associated procedure. The representation of a task as a function of the state of progress of the associated procedure can be carried out by adopting a particular colour to display the caption of the task as a function of the progress for example. This allows the crew to have an overall view of the progress of the processings of the various ongoing tasks. Such an overall view of the tasks and of their progress therefore allows the crew to be properly aware of their workload. The state of progress of a procedure associated with a task also allows the module for managing the tasks 8, when the procedure has terminated, to delete the task associated therewith. The deletion of a task may entail the deletion of other tasks by the module for managing the tasks. For example a task associated with an engine breakdown can have two sub-tasks, one associated with a hydraulic failure and the other associated with an electrical failure. The deletion of the task associated with the engine breakdown then entails the deletion of the sub-tasks associated with the electrical failure and with the hydraulic failure. The deletion of a task may also entail the addition of other tasks by the module for managing the tasks 8. Indeed, hierarchical dependences may exist between certain tasks. A task may encompass several other sub-tasks. A task may also have event-based ties with other tasks. The various ties between the tasks can be stored in the third database of tasks 13.

The task management module can initialize or reinitialize a procedure associated with a selected task. The reinitialization or the initialization of a procedure updates its state of progress to "no action performed" for example. For example, while carrying out a procedure, the pilot may be interrupted by an alert asking to be handled immediately. The pilot then changes procedure so as to deal with the alert. When the procedure for resolving the alert has terminated, he may return to the procedure that he was in the process of dealing with. However, certain actions already performed could have been rendered obsolete by dealing with the alert. It may then be necessary to resume the procedure from the beginning. Advantageously, initializing or reinitializing a procedure makes it possible to resume all the actions of the procedure so as to ensure that the actions have been performed correctly.

The module for managing the tasks 8 transmits the state of processing of an alert to the module for managing the alerts 4. The state of processing of an alert is dependent on the state of processing of the task associated with the alert. The state of the task associated with an alert depends on the state of progress of the processing of the procedure corresponding to the selected task. Thus an accomplished task making it possible to solve the problem that generated the alert may entail the deletion of the alert. An alert may be displayed in a different manner when the associated resolution measure is undergoing processing. For example an alert undergoing processing can be displayed in a different manner relative to the other alerts. The display of the state of processing of an alert, of a task and of a procedure allows the crew to have an overall view of the ongoing tasks and of the tasks to be carried out. This overall view allows the crew to be aware of the current and forthcoming workload. The crew can thus bring forward certain tasks when their workload is lighter. Bringing forward in this way makes it possible to avoid situations in the course of which the crew would have a significant number of task to process in parallel. Such situations actually entail an increase in the stress of the crew and increases the risk of errors in the processing of the procedures by the crew. Such errors can actually imperil the aircraft when the erroneous processing relates to an alert having a high level of seriousness.

In one embodiment of the device for managing the tasks 1 according to the invention, the various modules can be implemented in a programming language forming a computer program. Once the program has been compiled, the executable program obtained can be executed on one or more processors. The execution of the program makes it possible to fulfil the functions, described above, of the various modules of the device for managing the tasks 1 according to the invention.

FIGS. 2*a*, 2*b*, 2*c*, 2*d* represent an exemplary implementation of the device 1 for managing tasks to be carried out by a crew according to the invention. FIGS. 2*a*, 2*b*, 2*c*, 2*d* represent an exemplary display of a list of alerts, of a list of tasks and of a procedure associated with a task on one and the same display device 20. The display device 20 can be a screen.

Figure 2A:
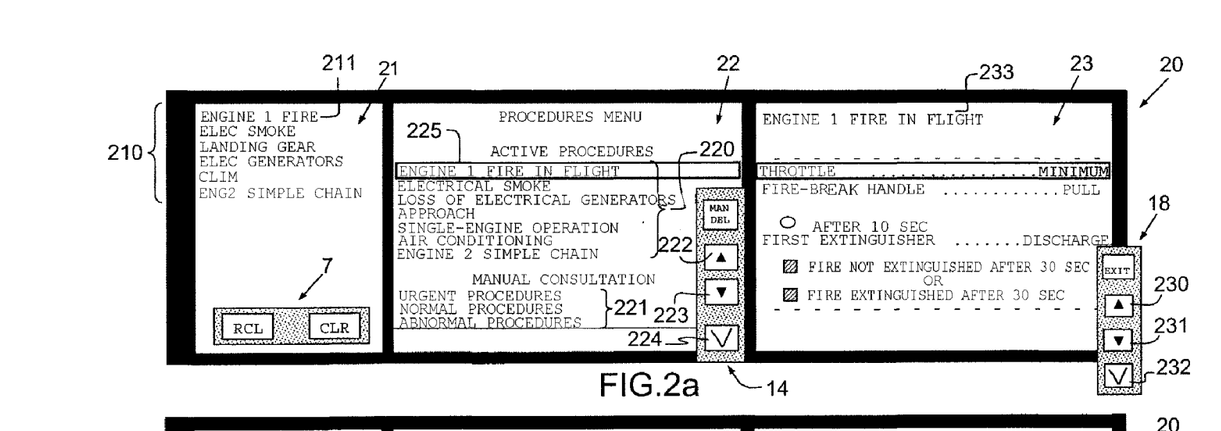
FIG. 2a: an exemplary implementation of the device for managing tasks to be carried out by a crew according to the invention.

The first display means 7 can be a first display panel 21. The first display panel 21 makes it possible to present a list of alerts 210 in progress originating from the module for managing the alerts 4. The first display panel 21 forms part of the display device 20.

The first monitoring panel 7 makes it possible notably to monitor the first display panel 21. The first monitoring panel can comprise two buttons: a first button CLR, a second button RCL. CLR is an acronym standing for the expression clear (i.e. delete), RCL is an acronym standing for the expression recall. The first button CLR makes it possible to erase alerts from the list of alerts. The alerts that can be erased are, for example, false alerts or alerts having a low level of seriousness.

The second display means 14 can be a second display panel 22. The second display panel 22 makes it possible to present a task list originating from the module for managing the tasks 8. The second display panel 22 forms part of the display device 20. The second display panel 22 presents tasks according to a "procedures menu". Each task is represented on the second display panel 22 by a caption of the procedure corresponding to the task. A first part 220 of the second display panel 22 presents active procedures. The active procedures may be:
 related to an alert;
 selected manually;
 relevant to a standard procedure;
 relevant to a task to be executed on a second external system 12.

A second part 221 of the second display panel 22 presents an accessway to a manual consultation of the fourth database of procedures 15. For example the set of consultable procedures is presented in the form of three sets: a first set of urgent procedures, a second set of normal procedures, a third set of abnormal procedures.

The second monitoring panel 14 allows a user to monitor the display of the tasks on the second display panel 22. The second monitoring panel can for example comprise four buttons:
 a third button MAN DEL, allowing manual deletion of a task from the list of active procedures, said task forming part of the subset of deletable tasks;
 a fourth button 222 and a fifth button 223 making it possible to navigate around the procedures menu, either around the list of active procedures or else around the list of manual consultations, navigation around the "procedures menu" makes it possible to select an item of the menu;
 a sixth button 224 makes it possible to validate a selection of an item of the "procedures menu".

An item of the "procedures menu" can correspond:
 to a procedure or task of list of active procedures;
 to a procedure of the list of manual consultation.

A validation of the selection of an item with the aid of the sixth button 224 makes it possible according to the item chosen:
 to display the procedure corresponding to the selected task or procedure;
 to display a list of urgent, normal, abnormal procedures when one of these items has been selected.

The display of a selected procedure can be performed on a third display panel 23. The third display panel 23 makes it possible to display a list of actions to be accomplished so as to perform the selected procedure. For example, in FIG. 2*a*, a first item or first task 225 "ENGINE 1 FIRE IN FLIGHT" from among the active procedures is selected from the second display panel 22. The first task 225 procedure or task corresponds to a first alert 211 "ENGINE 1 FIRE" displayed in the first display panel 21. A first procedure 233 "ENGINE 1 FIRE IN FLIGHT" is described on the third panel 23 by a series of actions such as: "THROTTLE . . . MINIMUM" signifying that the crew must push the throttle to the minimum possible, "FIRE-BREAK HANDLE . . . PULL", signifying that it is necessary to pull the fire-break handle. The first action selected in FIG. 2*a* is the action "THROTTLE . . . MINIMUM", this action is currently being carried out by the crew.

The third monitoring panel 18 can comprise four buttons for example:
 a seventh button EXIT making it possible to quit the procedure displayed on the third display panel 17;
 an eighth button 230 and a ninth button 231 for navigating around the list of actions of the displayed procedure;
 a ninth button 232 for validating a selected action.

Manual validation of a selected action, by way of the ninth button 232, makes it possible to acknowledge an action by marking it as performed so as to move on and carry out a following action.

Figure 2B:
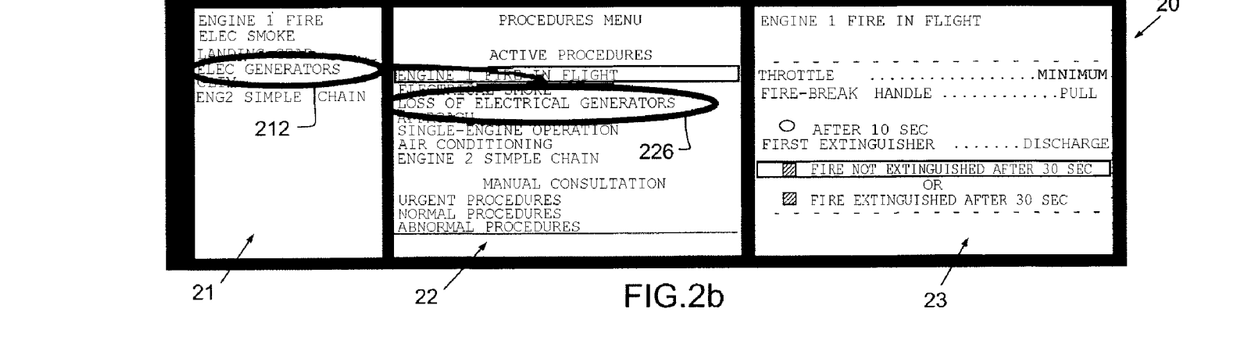
FIG. 2b: an exemplary alert generating a task.

FIG. 2*b* represents a second alert 212 named "ELEC GENERATOR" displayed on the first display panel 21. The second alert 212 is generated by the module for managing the alerts 4 on receipt for example of an alert originating from a first external system 2 such as a system for monitoring the operation of the electrical generators. The first alert 221 induces a second task or procedure 226 in the second display panel. The second task 226 is generated by the module for managing the tasks 8 on receipt of the second alert 212.

Figure 2C:
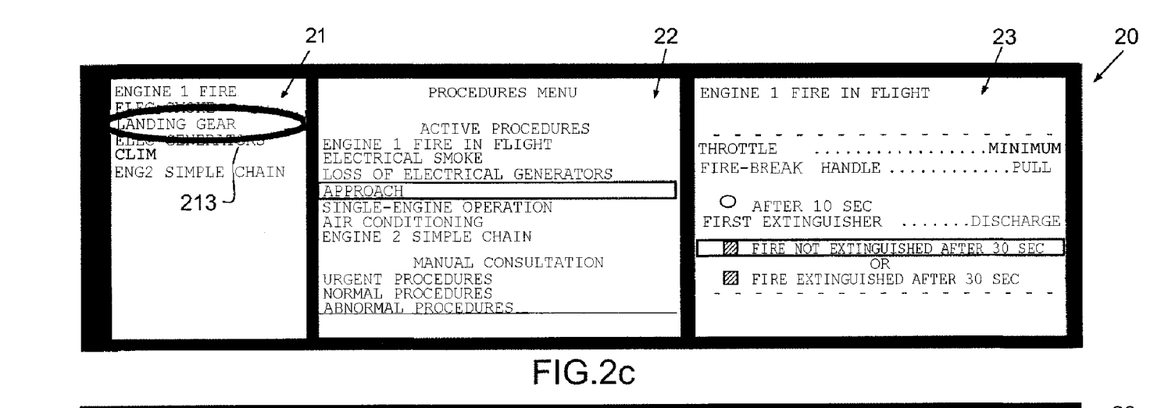
FIG. 2c: an exemplary alert not generating any task.

FIG. 2*c* represents a third alert 213 named "LANDING GEAR" displayed in the first display panel 21. The third alert 213 does not lead to the generation of a task by the task management module 8. Indeed, no action or procedure is required when the "LANDING GEAR" alert is generated by the module for managing the alerts 4.

Figure 2D:
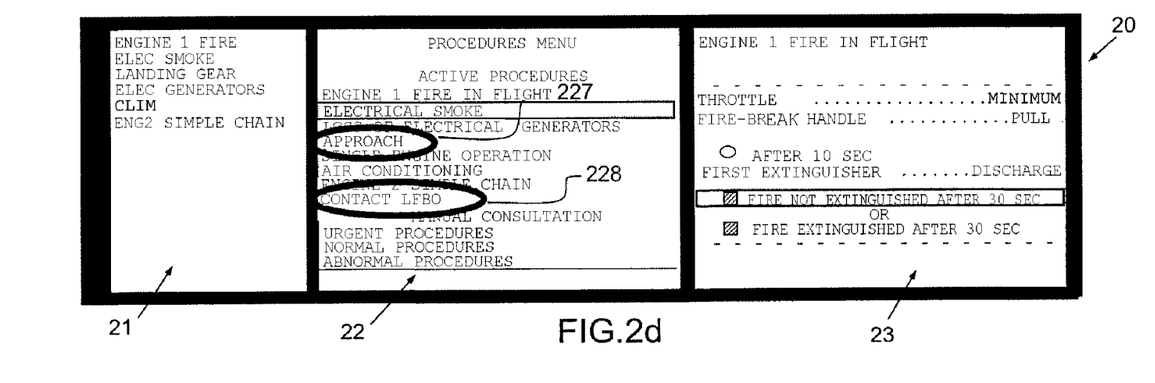
FIG. 2d: an exemplary task not originating from an alert.

FIG. 2*d* represents a third and a fourth task 227, 228 coming from second external systems 12. The third task 227, 228 is not related to any alert. The third task 227 is generated by the module for managing the tasks 8 on receipt of a task originating from a second external system 12. For example the FMS system can transmit a third task 227 to the module for managing the tasks 8, the third task 227 corresponding to an approach procedure for example. The ATC system can transmit a fourth task 227 to the module for managing the tasks 8: "CONTACT LFBO" signifying that the crew must contact for example Toulouse airport, LFBO being the ICAO code for Blagnac airport Toulouse, ICAO being an acronym standing for International Civil Aviation Organization.

In another embodiment of the invention, the first panel 7 for monitoring the alerts, the second panel 14 for monitoring the tasks and the third panel (18) for monitoring the procedure can be embodied by one and the same monitoring device. For example a mouse with three buttons can be used to navigate among the tasks and select a task. Other monitoring means may also be used such as: a generic keypad, a touch screen, a control ball.

In other embodiments, the first panel for displaying the alerts (5), the second panel for displaying tasks 11 and the third panel for displaying a procedure 17 may be presented on three different screens or on one and the same screen, either divided into three parts, each part being assigned to a panel 5, 11, 17, or alternatively exhibiting each panel 5, 11, 17.

The device for managing tasks 1 according to the invention advantageously allows a crew of an aircraft to have an overall view of the tasks that they will have to perform so as optionally to bring forward tasks that are complex to accomplish or take a great deal of time. This device advantageously makes it possible to smooth the workload of the crew by allowing them to bring tasks forward and carry them out when the crew's workload is lighter. Advantageously, the procedures can then be accomplished by the crew with a normal stress level. The quality with which said procedures are carried out is thereby improved, thus enhancing safety in the course of the flight of the aircraft for example.

The invention claimed is:

1. A device for managing alerts and piloting tasks carried out by a crew of an aircraft, the device comprising:
   an alert displaying module;
   an alert monitoring panel configured for interactive management of displayed alerts by the crew;
   a module for managing alerts configured to perform steps comprising:
      generating alerts on receipt of information originating from a first system of the aircraft or on receipt of data if the received data is interpreted as an alert;
      sorting the generated alerts according to a level of seriousness of each generated alert and generating a corresponding list of alerts;
      managing the list of alerts by performing steps comprising:
         displaying the list of alerts on the alert displaying module; and
         deleting a first alert from the list of alerts when receiving a delete alert order originating from the alert monitoring panel or when a task corresponding to the first alert is deleted; and
      transmitting the list of alerts to a module for managing tasks;
   a task displaying module;
   a task monitoring panel configured for interactive management by the crew of displayed tasks by selecting or deleting a displayed task or inserting a task;
   the module for managing tasks configured to perform steps comprising:
      creating a task:
         on receipt of a second alert, the second alert being generated by the module for managing alerts and indicating a processing procedure to be carried out by the crew, the task being associated with the processing procedure, or
         associated with an operational procedure, or
         associated with a procedure selected by the crew via the task monitoring panel from among a set of operational procedures that is presented by a procedure displaying module, the set of operational procedures being stored in a first database, or
         on receipt of actions to be carried out originating from an avionics systems;
      transmitting a list of tasks to be displayed to the task displaying module;
      deleting a first task when receiving an order to delete the first task by the crew via the task monitoring panel or when a corresponding alert is deleted; and
      selecting a task to be transmitted to a module for managing procedures according to the task monitoring panel;
   a procedure displaying module; and
   a procedure monitoring panel configured for interactive management of displayed procedures by the crew by selecting a displayed action of a procedure;
   wherein the module for managing procedures is configured to perform steps comprising:
      searching in a database for a procedure to be displayed according to a selected task, the procedure to be displayed comprising a list of at least one action to be carried out; and
      transmitting the procedure to be displayed to the procedure displaying module.

2. The device according to claim 1, wherein operational procedures are transmitted to the module for managing tasks.

3. The device according to claim 1, wherein the module for managing procedures is further configured to perform steps comprising:
   calculates calculating a state of progress of a first procedure as a function of acknowledgements of actions making up the first procedure, said first procedure comprising at least one action to be carried out;
   transmitting the calculated state of progress to the module for managing tasks and to the module for displaying procedures; and
   storing the state of progress in a second database.

4. The device according to claim 3, wherein the state of progress of the first procedure is initialized by the module for managing procedures on receipt of an initialization order originating from the module for managing tasks.

5. The device according to claim 3, wherein, on receipt of a state of progress indicating that all the actions of the first procedure have been carried out, the module for managing tasks deletes a task corresponding to the first procedure.

6. The device according to claim 3, wherein an acknowledgement of an action is transmitted to the module for managing procedures by:
   a second system of the aircraft carrying out the action; or
   the module for monitoring procedures being actuated by the crew.

7. The device according to claim 3, wherein information relating to an action of the first procedure is displayed in response to the module for managing procedures receiving an order to display information relating to an action selected from among the actions displayed by the module for displaying procedures, the selected action being selected by the crew via the module for monitoring procedures.

8. The device according to claim 1, wherein the module for displaying alerts, the module for displaying tasks, and the module for displaying procedures utilize the same display device.

9. The device according to claim 1, wherein the module for monitoring alerts, the module for monitoring tasks, and the module for monitoring procedures are provided by a single monitoring device.

* * * * *